July 14, 1931. S. I. KELLEY 1,814,934
WINDSHIELD WIPER
Filed Jan. 16, 1930
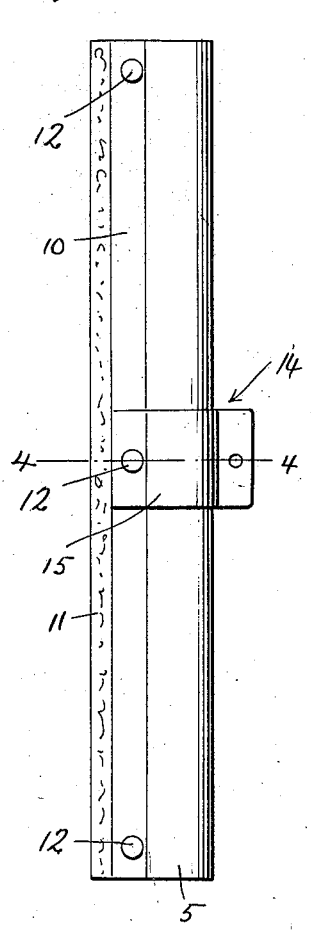
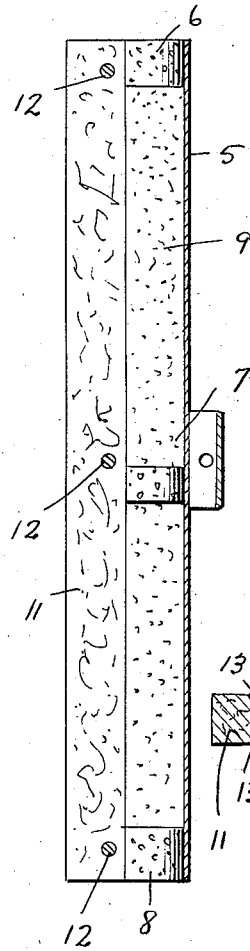
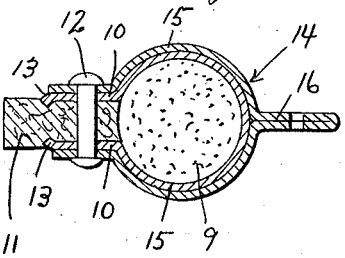
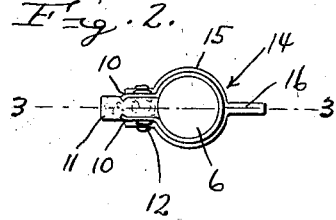
Inventor
Samuel I. Kelley
By Clarence A. O'Brien
Attorney Patented July 14, 1931

1,814,934

UNITED STATES PATENT OFFICE

SAMUEL I. KELLEY, OF ST. LAWRENCE, SOUTH DAKOTA

WINDSHIELD WIPER

Application filed January 16, 1930. Serial No. 421,245.

This invention relates to improvements in the construction of windshield wipers such as are used on present day motor vehicles, and it has more particular reference to that part of the structure which is generally referred to as a squeegee.

The invention has more particular reference to an improved squeegee embodying self-contained chemical means for minimizing the depositing of ice and snow on the windshield, whereby to enhance the utility of the wiper construction and to promote clear and dependable vision for safe driving in inclement weather.

In the drawings:

Figure 1 is an elevational view of a wiper constructed in accordance with the present invention.

Figure 2 is a top plan view of the same.

Figure 3 is a central longitudinal sectional view on the line 3—3 of Figure 2.

Figure 4 is a transverse cross section on the line 4—4 of Figure 1.

In carrying the invention into practice, I have found it expedient to employ a single sheet of metal. This is of appropriate length and proportion and it is bent between its ends to form an open-ended tubular portion 5 which functions primarily as a container. In transforming this part 5 into a container, I provide three cork plugs 6, 7 and 8 respectively.

The plugs 6 and 8 are disposed in the opposite ends and serve to close these ends whereas the central plug 7 functions as a partition and divides the container into upper and lower compartments. These compartments are filled with common table salt generally designated by the numeral 9.

The front side of the tube is open through the medium of the existing longitudinal slots and the metal projects beyond this slot and provides retaining flanges 10 between which an absorbent strip or squeegee element 11 is disposed in retained position by rivets 12. Incidentally, the extremities of the flanges 10 are inturned as at 13 to better grip the absorbent strip.

The absorbent strip is of a proportion to extend beyond the inturned edges 13 at its outer end. Its inner edge or end portion is disposed in contact with the salt filler in the upper and lower compartments. The reference character 14 designates generally an attaching bracket. This includes a portion 15 which embraces the container and it also includes a bent apertured ear 16 with which the actuating arm (not shown) of the operating means is connected.

This wiper is adapted to move back and forth in the usual way and the rubber squeegee strip is in contact with the windshield glass in customary manner. This wiper strip 11 is preferably of a porous material. It may be porous rubber or better still, felt of appropriate texture. The idea is to have it of absorbent material. Thus, as the strip 11 is worked back and forth across the surface of the glass, it picks up a certain amount of moisture and which picks up by capillary attraction, a salt solution from the salt in the compartments or the tubular container 5.

The salt solution is wiped slowly into the rain solution and converts the latter into a chemical medium or solution wiped on the glass and which will minimize freezing and thereby prevent depositing of ice and snow.

The idea of providing a self-contained salt in the container and utilizing a porous wiping strip for the production of an endless chemical agent for wiping on the windshield is new.

It is thought that persons skilled in the art to which the invention relates will be able to obtain a clear understanding of the invention after considering the description in connection with the drawings. Therefore, a more lengthy description is regarded as unnecessary.

Minor changes in shape, size, and rearrangement of details coming within the field of invention claimed may be resorted to in actual practice if desired.

I claim:

A windshield wiper of the type described comprising an elongated nonforaminous cylindrical container entirely filled with common normally dry table salt, and having a longitudinal opening extending substantially the length of the container, parallel flanges extended from and co-extensive with each edge of said opening and an inturned retaining lip on the outer edge of each of said flanges, and an absorbent wiper strip between said flanges and in direct intimate contact with the salt and maintained so positioned by said retaining lips, and rivets through said plates and said wiper strip for maintaining them securely assembled, and removable plugs closing the ends of said container, and a removable plug within the container separating it into compartments, said wiper strip adapted to convey moisture from the windshield to the said salt for forming a salt solution in the strip only for distribution by said wiper.

In testimony whereof I affix my signature.

SAMUEL I. KELLEY.